United States Patent [19]

Usui

[11] Patent Number: 5,553,042
[45] Date of Patent: Sep. 3, 1996

[54] OPTICAL DISK RECORDING DEVICE

[75] Inventor: Akira Usui, Hamamatsu, Japan

[73] Assignee: Yamaha Corporation, Hamamatsu, Japan

[21] Appl. No.: 261,631

[22] Filed: Jun. 17, 1994

[30] Foreign Application Priority Data

Jul. 1, 1993 [JP] Japan .................... 5-189245

[51] Int. Cl.$^6$ ..................................... G11B 7/00
[52] U.S. Cl. ................................. 369/50; 369/47
[58] Field of Search ................... 369/54, 50, 53, 369/47, 48, 49, 32, 124

[56] References Cited

U.S. PATENT DOCUMENTS 5,276,667  1/1994  Tsutsui et al. ........................... 369/59

Primary Examiner—Georgia Y. Epps
Assistant Examiner—Muhammad N. Edun
Attorney, Agent, or Firm—Loeb & Loeb LLP

[57] ABSTRACT

An optical disk recording device capable of recording data by projecting, laser pulse on a disk such as a CD-WO disk on which time information such as ATIP data or address information used for writing is previously recorded while controlling drive of a spindle for rotating the disk by using the information for writing includes a synchronizing signal detection circuit for detecting a synchronizing signal such as an ATIP synchronizing signal from a signal read from the disk, a clock generation circuit for generating a clock from the read out signal by locking PLL (phase lock loop), a counter for counting the clock generated by the clock generation circuit during a period between respective synchronizing signals detected by the synchronizing signal detection circuit, and a slip detection circuit for detecting a slip in the PLL of the clock generation circuit when a count of the counter differs from a predetermined value. A difference between the time information or address information and recorded data on the disk can be detected in real time, so that a proper processing such as stopping of recording can be made immediately upon detection of the slip in the PLL.

15 Claims, 3 Drawing Sheets

OPTICAL DISK RECORDING DEVICE

BACKGROUND OF THE INVENTION

This invention relates to an optical disk recording device and, more particularly, to an optical disk recording device in which data is recorded by projecting laser pulse on a disk on which time information or address information used for writing is pre-recorded while controlling drive of a spindle for rotating the disk by using the information for writing.

Known in the art of a write once read mostly optical disk, is a CD-WO (Compact Disc - Write Once) disk. In a CD-WO disk is recorded a previously wobbled ATIP (Absolute Time In Pre-groove) data before data is recorded. The ATIP data includes a position detection synchronizing signal (so called ATIP Sync), time data representing absolute time (minute, second and frame) at each position on the disk and CRC data.

In the CD-WO system, a single optical pickup serves both as a recording optical pickup and a reproducing optical pickup and, therefore, ATIP data is read out simultaneously with recording of data on the disk. A clock is generated in synchronism with the read out ATIP data and a spindle control is performed to obtain a desired disk rotation speed on the basis of this clock. This clock has, as shown in FIG. 2, a frequency of 6.3 kHz and is determined to synchronize with the ATIP Sinc at every 84 clocks. For generating this clock, a PLL circuit is normally employed.

According to the data recording method using the PLL, by locking the PLL at the start of recording and thereby controlling a spindle, phase difference between read out ATIP data and recorded data is held within +180 degrees. Actually, however, a phase difference exceeding 180 degrees is often produced due to various causes including vibration of the spindle, dust and noise and, if the phase difference increases further, the PLL is locked again with the phase shifted by more than 180 degrees. This phenomenon is generally called a PLL slip. In a disk such as the CD-WO disk in which the data recording position is strictly determined according to the standard format, a phase error of even one clock (bit slip) causes failure in data recording.

Since writing of data is allowed only once in a CD-WO disk, if a bit slip occurs during recording of a CD-WO disk, a part or whole of the disk becomes unrecordable. For recording the same data again, recording must be made by using an unrecorded area of the disk or, alternatively, recording must be made from the beginning on a different disk. Since the difference in phase (position) between the ATIP data and the recorded data is not known during the recording operation, efficiency of data recording is rather poor and a disk is wasted.

It is, therefore, an object of the invention to provide an optical disk recording device to eliminate the above described disadvantage of the prior art optical disk recording device by providing an optical disk recording device capable of detecting a position error of recorded data by detecting, in real time, slip of a clock extracting PLL relative to read out ATIP data.

SUMMARY OF THE INVENTION

For achieving the above described object of the invention, an optical disk recording device capable of recording data by projecting laser pulse on a disk on which time information or address information used for writing is recorded while controlling drive of a spindle for rotating the disk by using the information for writing comprises synchronizing signal detection means for detecting a synchronizing signal from a signal read from the disk, clock generation means for generating a clock from the read out signal by locking PLL (phase lock loop), a first Counter for counting the clock generated by the clock generation means during a period between respective synchronizing signals detected by the synchronizing signal detection means, and slip detection means for detecting a slip in the PLL of the clock generation means when a count of the first counter differs from a predetermined value.

According to the invention, by counting the clock generated by the PLL during a period between the respective ATIP synchronizing signals which are sequentially detected during writing of data on a disk, a slip of the PLL is detected in real time from the count value. In recording of data on a CD-WO disk which requires entire recording time of 60 minutes, for example, by displaying result of detection of a slip of the PLL and stopping recording immediately upon detection of a slip, data recording time after the occurrence the slip and time for confirming the slip after completing recording of data can be saved. Further, by recording data to be recorded from the beginning again from a position on the same disk where data can be recorded on the basis the result of detection of the slip, waste of the disk can be avoided and, therefore, an efficient recording of data on the disk can be achieved.

A preferred embodiment of the invention will be described below with reference to the accompanying drawings.

BRIEF DESCRIPTION OF THE DRAWINGS

In the accompanying drawings.

DESCRIPTION OF A PREFERRED EMBODIMENT

Figure 1:
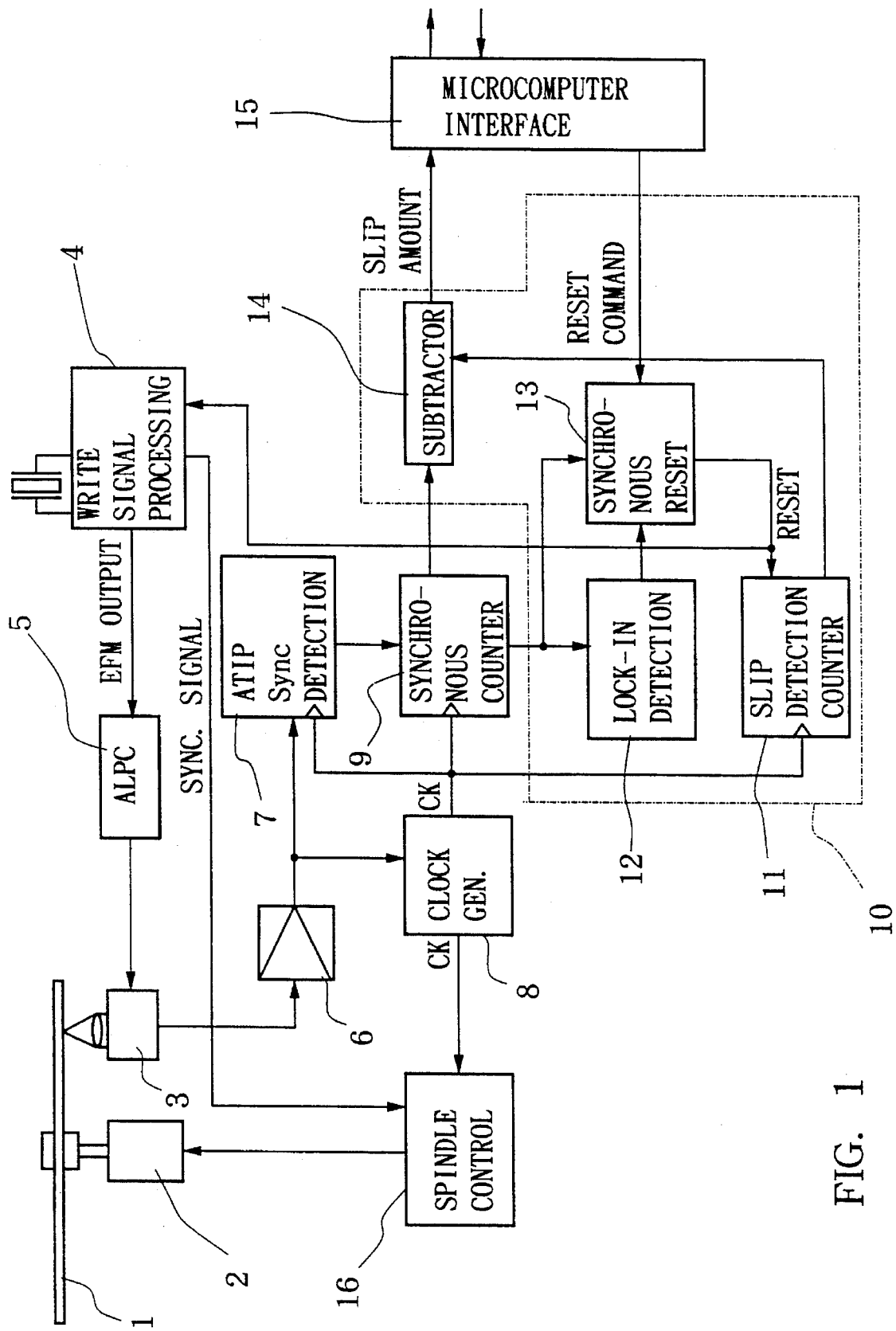
FIG. 1 is a block diagram showing an essential part of an embodiment of a CD-WO disk recording device.

Referring to FIG. 1, a disk 1 is driven and rotated by a spindle motor 2. Data is recorded on the disk 1 by projecting laser beam from an optical pickup 3 which is used both for recording and reproducing data. During recording, an EPM output signal provided by a write signal processing circuit 4 is supplied to a laser power control circuit 5 and laser beam which is of a larger power than laser beam used during reproduction is projected on the disk 1 to perform a pit recording. The spindle motor 2 is controlled by a spindle control circuit 16. This Spindle control circuit 16 performs a spindle control in accordance with data by supplying a synchronizing signal from the write signal processing circuit 4. In FIG. 1, illustration of a circuit, which is know per se, fox driving the optical pickup 3 is omitted.

Figure 2:
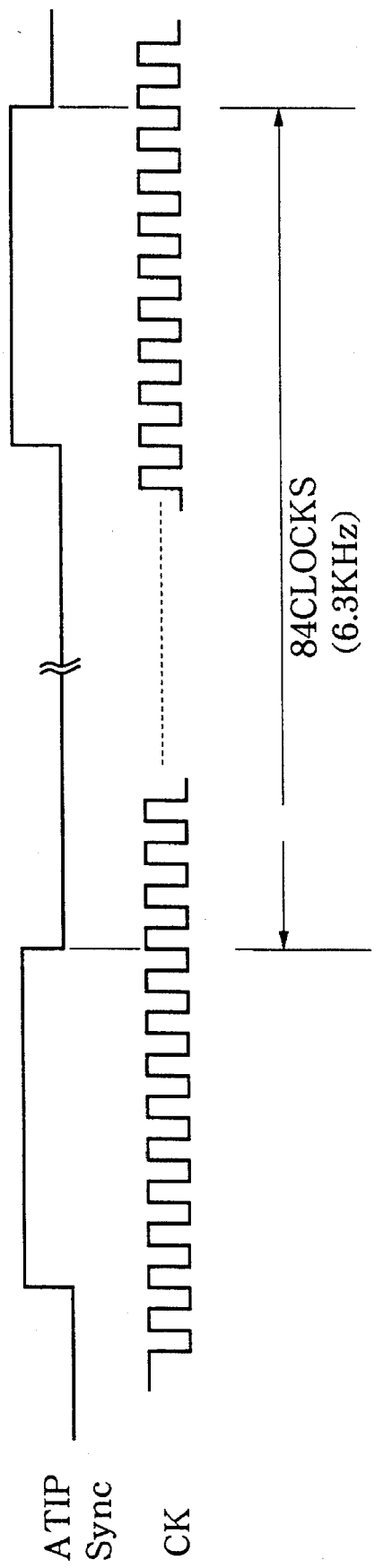
FIG. 2 is a waveform diagram showing the waveform of the synchronizing signal used in this embodiment.
Figure 3:
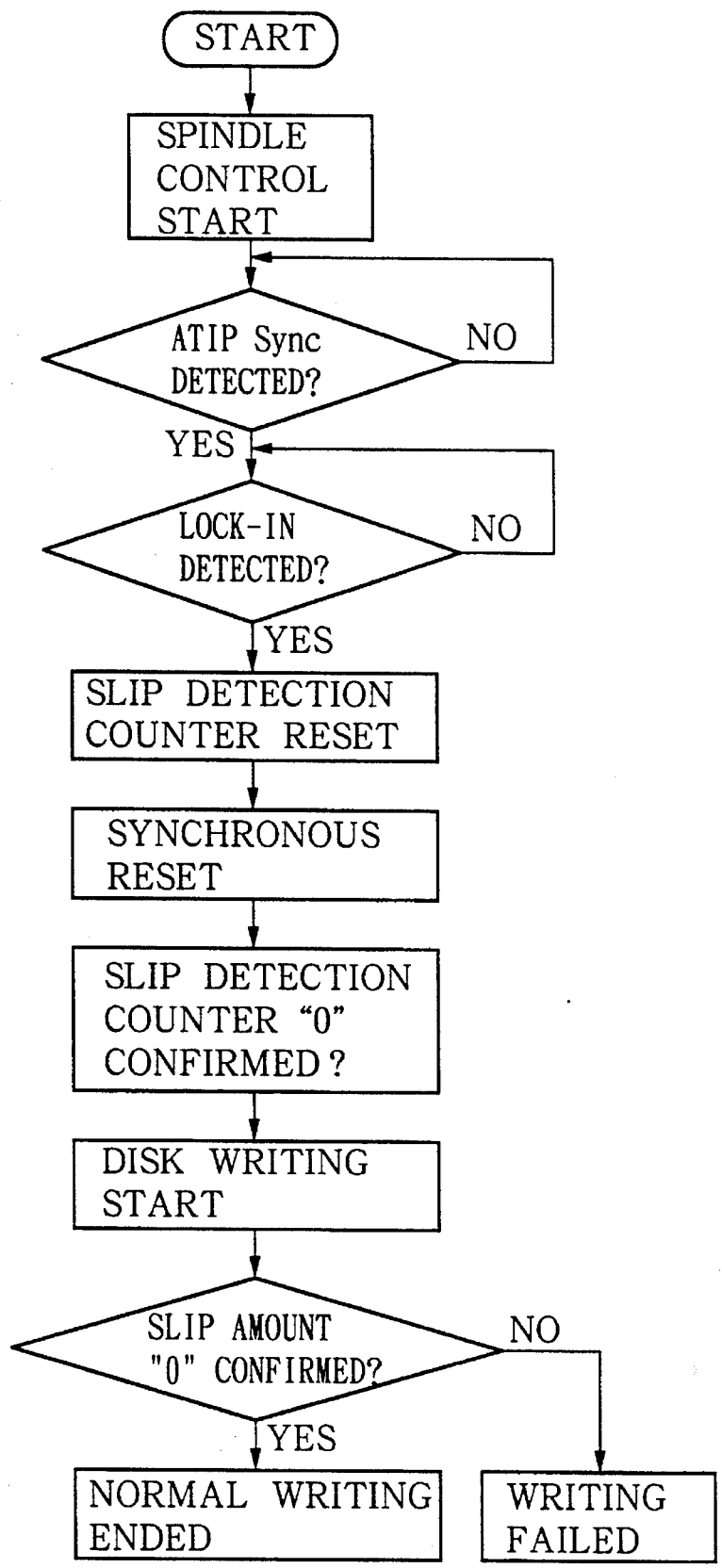
FIG. 3 is a flow chart showing operation during recording of data.

The operation during recording of data will now be described with reference to the flow chart of FIG. 3. During recording, ATIP data which was previously recorded on the disk 1 is read out and amplified by an RF amplifier 6. A position detection synchronizing signal ATIP Sync used for detecting a position on the disk 1 is detected from an output of the RF amplifier by a synchronizing signal detection circuit 7. A clock CK which is used as a reference for timing of the recording operation is generated by a clock generation circuit 8 by using PLL on the basis of ATIP data contained in the output of the RF amplifier Relationship between the synchronizing signal ATIP Sync and the clock CK is shown in FIG. 2. One ATIP data corresponds to one subcoding frame of data to be recorded. Data of one subcoding frame is recorded in a divided form of 98 EFM frames.

For detecting a s PLL slip in the clock generation circuit 8, there are provided a Sync synchronous counter 9 for counting the clock CK provided by the clock generation circuit 8 and a slip detection circuit 10 for detecting a slip on the basis of the count of this counter 9.

The Sync synchronous counter 9 resets its count each time the ATIP Sync is applied from the synchronizing signal detection circuit 7 and repeats counting from 0 to 83 periodically so long as the clock generation circuit 8 performs its normal operation. Once a PLL slip occurs in the clock generation circuit 8 and the count of the counter 9 is reset at a value other than 83, the slip detection circuit 10 gives the judgement that a PLL-slip has occurred.

this embodiment, the slip detection circuit 10 includes a slip detection counter 11 which counts the clock CK from the generation circuit 8 in the same manner as the Sync synchronous counter 9 and returns to 0 automatically upon counting 83, and a subtractor 14 which subtracts an output of the Sync synchronous counter 9 from an output of the slip detection counter 11 and thereby provides a slip amount detection output. The slip detection circuit 10 further includes a lock-in detection circuit 12 which confirms the lock state of the PLL and a synchronous reset circuit 13 for compulsorily resetting the slip detection counter 11 and the write signal processing circuit 4 only once in response to a reset command from the lock-in detection circuit 12 before start of writing in accordance with a write start command given by an unillustrated microcomputer through an interface 15. The lock-in detection circuit 12 specifically receives the ATIP Sync from the Sync synchronous counter 9 as input data and, when it has detected one ATIP Sync three times consecutively during a predetermined period of time, i t judges that the PLL ifs locked and supplies a reset command to the synchronous reset circuit 13. When the lock-in circuit 12 has not detected one ATIP Sync three times consecutively, it judges that the PLL is not locked yet.

The PLL slip detection operation of the CD-WO disk recording device having the above described structure will now be described. Upon start of preparation for data recording, the PLL of the clock generation circuit 8 is locked and an ATIP Sync is detected from the generated clock CK by the synchronizing signal detection circuit 7. The Sync synchronous counter 9 counts the clock CK in the above described manner and is reset each time the ATIP Sync is detected by the synchronizing signal detection circuit 7. Unless a PLL slip occurs in the clock generation circuit 8, the Sync synchronous counter 9 is reset at Count 83.

When it is desired to start detection of a PLL slip, a command to start detection of a PLL slip is given by the microcomputer. The lock-in detection circuit 12 confirms that the PLL is locked and supplies a reset command to the synchronous reset circuit 13. In response to the reset command, the synchronous reset circuit 13 resets the slip detection counter 11 only once on the basis of the input data from the Sync synchronous counter 9 so that the count of the Sync synchronous counter 9 becomes the same as that of the slip detection counter 11.

Thereafter, the Sync synchronous counter is repeatedly reset compulsorily at count 83 by the synchronizing signal detection circuit 7 and the slip detection counter 11 returns repeatedly to 0 automatically at count 83 whereby the Sync synchronous counter 9 and the slip detection counter 11 continue to output the same value unless a PLL slip or an out-of-lock state occurs. At this time, the output of the subtractor 14 indicating the amount of slip is 0.

If, for example, a PLL slip of one clock in the direction of a lower frequency has occurred in the clock generation circuit 8, the Sync synchronous counter 9 which should normally be reset upon counting 83 by the synchronizing signal detection circuit 7 is reset at count 82 in the present case. A compulsory reset of the slip detection counter 11 is made only by the above described command from outside and the slip detection counter 11 returns automatically to 0 after counting 83 regardless of presence or absence of a PLL slip. By this arrangement, the Sync synchronous counter 9 and the slip detection counter 11 thereafter continue counting with their outputs being different by one clock. This difference between the outputs computed by the subtractor 14 and is Supplied to the microcomputer for detection.

When the PLL is Out of lock, a different value is supplied to the microcomputer each time.

According to this embodiment, difference between absolute time information and a recorded signal on the disk can be detected in real time and judgement by the microcomputer for a proper processing can be made including stop of recording in a case where the amount of difference exceeds a predetermined value. Thereafter, a proper processing can be made such as moving the optical pickup 3 to a position on the disk 1 where recording can be made so that recording of data to be recorded may be resumed from this position.

The scope of the invention is not limited to the above described embodiment. In the embodiment, for example, the slip detection counter and the subtractor are provided for detecting a PLL slip. Alternatively, detection of a PLL slip can be realized with only the Sync synchronous counter 9. In this case, a count output of the Sync synchronous counter 9 is transmitted directly to the microcomputer for monitoring and it may be judged that a PLL slip has occurred when a count immediately before resetting is a value other than 83.

In the above described embodiment, description has been made about an optical disk recording device in which a CD-WO disk is used. The invention is applicable also to optical disk recording devices which use various other types of optical and magneto-optical disks on which a synchronizing signal for writing is previously recorded.

What is claimed:

1. An optical disk recording device capable of recording data by projecting a laser pulse onto a disk on which time or address information used for writing is prerecorded while controlling a drive of a spindle for rotating the disk by using the time or address information, the optical disk recording device comprising:

synchronizing signal detection means for detecting a synchronizing signal from the prerecorded time or address information read from the disk;

clock generation means for generating a clock from the detected synchronizing signal using a locking PLL (phase lock loop);

a first counter for counting the clock generated by the clock generation means during a period between respective synchronizing signals detected by the synchronizing signal detection means; and slip detection means for detecting a slip in the PLL of the clock generation means when a count of the first counter differs from a predetermined value.

2. An optical disk recording device as defined in claim 1, wherein said slip detection means comprises a second counter which counts the clock generated by said clock generation means and is automatically reset when a count has reached the predetermined value, and a subtractor which subtracts the count of said first counter from the count of said second counter and outputs the difference between the two outputs as an amount of the slip in the PLL.

3. An optical recording device for recording data onto an optical disk that has prerecorded data in a pre-groove, the optical recording device comprising:

a synchronizing signal detection circuit that detects a synchronizing signal from the prerecorded data on the optical disk;

a clock generation circuit that generates a clock signal from the detected synchronizing signal;

a first counter circuit that counts the clock signal generated by the clock generation means between sequentially detected synchronizing signals;

a slip detection circuit that detects a slip in the clock signal when a value of the first counter circuit differs from a first predetermined value.

4. An optical disk recording device according to claim 3, wherein the clock generation circuit generates the detected clock signal using a phase lock loop (PLL).

5. An optical disk recording device according to claim 3, wherein the first counter circuit is reset to a second predetermined value by the detected synchronizing signal.

6. An optical disk recording device according to claim 3, wherein the prerecorded data that is used to produce the synchronizing signal is prerecorded on the optical disk as wobbled Absolute Time In Pre-groove (ATIP) data.

7. An optical disk recording device according to claim 3, wherein the slip detection circuit further includes a second counter circuit that counts the clock signal generated by the clock generation circuit until the first predetermined value is reached; and a subtractor which subtracts the value of the first counter circuit from a value of the second counter circuit to provide an output representative of an amount of slip.

8. An optical disk recording device according to claim 7, wherein the second counter is automatically reset to the second predetermined value when the first predetermined value is reached.

9. An optical disk recording device according to claim 7, wherein the amount of slip is output to a microcomputer interface.

10. An optical disk recording device according to claim 7, further comprising a write signal processing circuit for controlling the recording of data onto the optical disk and a spindle control circuit for controlling the drive of a spindle on which the optical disk is rotated.

11. An optical disk recording device according to claim 10, wherein the slip detection circuit further comprises a lock-in detection circuit for detecting a lock state of a phase lock loop (PLL), and a synchronous reset circuit for resetting the second counter and the write signal processing circuit.

12. An optical disk recording device according to claim 3, wherein the slip detection circuit is activated in response to a microcomputer command.

13. An optical disk recording device according to claim 3, wherein recording can be stopped if an amount of slip is detected.

14. An optical disk recording device according to claim 3, wherein the prerecorded data is prerecorded during manufacture of the optical disk.

15. An optical disk recording device according to claim 3, wherein the first predetermined value is determined by an initially detected synchronizing signal.

* * * * *